United States Patent
Connolly et al.

(10) Patent No.: US 12,202,245 B2
(45) Date of Patent: Jan. 21, 2025

(54) LAMINATED POLYMER WINDOWS

(71) Applicant: Apple Inc., Cupertino, CA (US)

(72) Inventors: Paul M Connolly, San Francisco, CA (US); Albert J Golko, Saratoga, CA (US); Arturo Llamazares Domper, San Jose, CA (US); David E Kingman, San Francisco, CA (US); Derek C Krass, Santa Cruz, CA (US); Martin Gross, Haimhausen (DE); Olivier C Barthomeuf, Santa Clara, CA (US); Peter F Masschelein, Campbell, CA (US); Yogesh Upreti, Riedstadt (DE)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 18/083,135

(22) Filed: Dec. 16, 2022

(65) Prior Publication Data

US 2023/0256711 A1    Aug. 17, 2023

Related U.S. Application Data

(60) Provisional application No. 63/311,340, filed on Feb. 17, 2022.

(51) Int. Cl.
*B32B 7/12* (2006.01)
*B32B 1/00* (2006.01)
(Continued)

(52) U.S. Cl.
CPC .................. *B32B 7/12* (2013.01); *B32B 1/00* (2013.01); *B32B 3/26* (2013.01); *B32B 7/022* (2019.01);
(Continued)

(58) Field of Classification Search
CPC ... B32B 1/00; B32B 2250/02; B32B 2250/24; B32B 2255/10; B32B 2255/205;
(Continued)

(56) References Cited

U.S. PATENT DOCUMENTS 7,867,605 B2    1/2011    Moran et al.
8,101,267 B2    1/2012    Samuels et al.
(Continued)

FOREIGN PATENT DOCUMENTS

EP    3572259 A1    11/2019
GB    1477244 A    6/1977
KR    100738461 B1    8/2007

*Primary Examiner* — Lawrence D Ferguson
(74) *Attorney, Agent, or Firm* — Treyz Law Group, P.C.; Joseph F. Guihan (57) ABSTRACT

A system may have structure. The structures may include laminated structures formed by attaching inner and outer layers together with a layer of adhesive. The inner and outer layers in a structure may be formed from polymer such as polycarbonate. Forming the structure layers from polymer may allow the structure to have desired curvature. To improve safety and/or acoustic performance of the structure, the inner and outer structure layers may be formed from different materials. The outer polymer layer may be formed from polycarbonate and the inner polymer layer may be formed from a more brittle polymer such as polymethyl methacrylate (PMMA).

17 Claims, 7 Drawing Sheets

(51) Int. Cl.
  *B32B 3/26* (2006.01)
  *B32B 7/022* (2019.01)
  *B32B 27/08* (2006.01)
  *B32B 27/30* (2006.01)
  *B32B 27/36* (2006.01)
  *B32B 33/00* (2006.01)
  *B32B 37/12* (2006.01)
  *B32B 37/18* (2006.01)

(52) U.S. Cl.
  CPC ............ *B32B 27/08* (2013.01); *B32B 27/308* (2013.01); *B32B 27/365* (2013.01); *B32B 33/00* (2013.01); *B32B 37/12* (2013.01); *B32B 37/182* (2013.01); *B32B 2250/02* (2013.01); *B32B 2250/24* (2013.01); *B32B 2307/41* (2013.01); *B32B 2307/412* (2013.01); *B32B 2333/12* (2013.01); *B32B 2369/00* (2013.01); *B32B 2605/006* (2013.01)

(58) Field of Classification Search
  CPC .......... B32B 2307/41; B32B 2307/412; B32B 2333/12; B32B 2369/00; B32B 2605/006; B32B 27/08; B32B 27/308; B32B 27/365; B32B 3/26; B32B 33/00; B32B 37/12; B32B 37/182; B32B 7/022; B32B 7/12
  See application file for complete search history.

(56) References Cited

U.S. PATENT DOCUMENTS

| | | |
|---|---|---|
| 9,281,186 B2 | 3/2016 | Wootton |
| 10,391,807 B2 | 8/2019 | Muth et al. |
| 10,788,699 B2 | 9/2020 | Wang |
| 2010/0112355 A1* | 5/2010 | Clothier ................ B64C 1/1492 156/243 |
| 2021/0268777 A1 | 9/2021 | Jacobus Maas et al. |

* cited by examiner

LAMINATED POLYMER WINDOWS

This application claims priority to U.S. provisional patent application No. 63/311,340, filed Feb. 17, 2022, which is hereby incorporated by reference herein in its entirety.

FIELD

This relates generally to structures that pass light, and, more particularly, to windows.

BACKGROUND

Windows are used in buildings and vehicles. Windows may be formed from glass or other transparent material.

SUMMARY

A system such as a building or automobile may have windows. The windows may include laminated windows formed by attaching inner and outer window layers together with a layer of polymer adhesive.

The inner and outer window layers in a window may be formed from polymer such as polycarbonate. Forming the window layers from polymer may allow the window to have desired curvature.

To improve safety and/or acoustic performance of the window, the inner and outer window layers may be formed from different materials. As one example, the outer polymer layer may be formed from polycarbonate and the inner polymer layer may be formed from a more brittle polymer such as polymethyl methacrylate (PMMA).

The outer polymer layer may optionally have an opaque portion formed around the periphery of the window. This may allow the vehicle body to be adhered to the less brittle outer polymer layer rather than a more brittle inner polymer layer. The inner polymer layer may be formed in a central opening defined by the opaque portion of the outer polymer layer.

DETAILED DESCRIPTION

Systems may be provided with windows. For example, a vehicle or other system may have glass windows. Laminated glass structures (windows) may be formed by attaching two or more glass layers together with adhesive. In some configurations, glass layers may be molded to form curved shapes prior to lamination. Forming glass layers with desired curved shapes may cause excessive stress on the glass layers. This stress may result in the glass being insufficiently robust for certain applications. Glass forming of complex curved parts also presents challenges in terms of surface tolerance and optical properties (distortion).

Polymer layers may be used instead of glass to form windows such as laminated windows. The polymer layers may be capable of holding desired curved shapes while maintaining satisfactory mechanical strength.

The systems in which the windows are used may be buildings, vehicles, or other desired systems. Illustrative configurations in which the system is a vehicle such as an automobile may sometimes be described herein as an example. This is merely illustrative. Windows may be formed in any desired systems.

Figure 1:
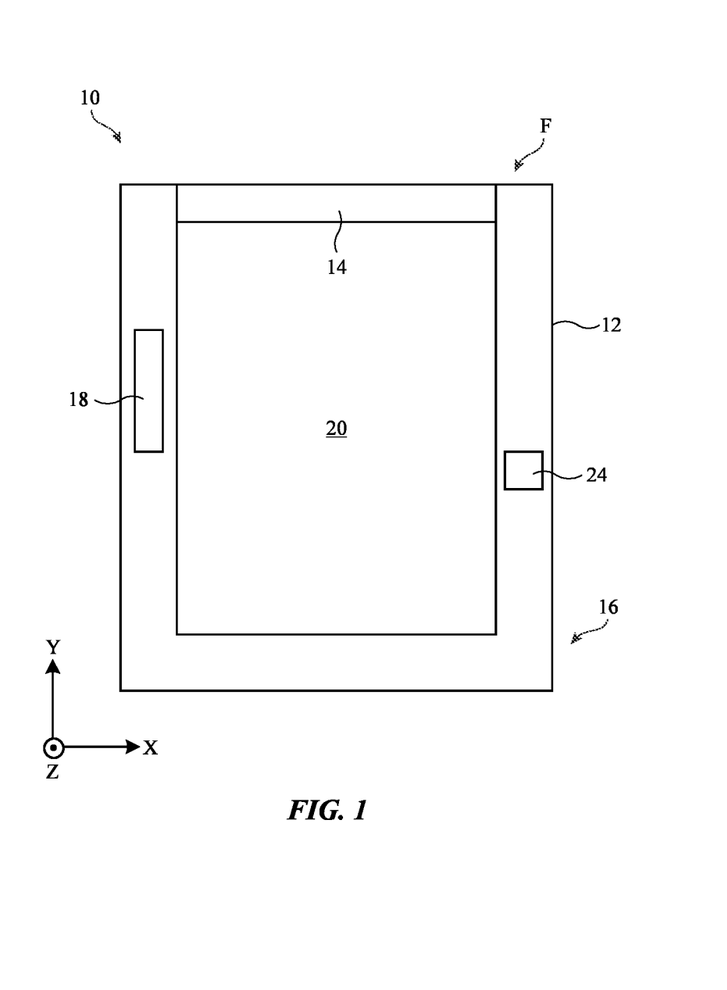
FIG. 1 is a top view of an illustrative system with a window in accordance with an embodiment.

An illustrative system of the type that may include windows is shown in FIG. 1. System 10 may be a vehicle, building, or other type of system. FIG. 1 is a top view of an illustrative vehicle 10. In the example of FIG. 1, vehicle 10 is the type of vehicle that may carry passengers (e.g., an automobile, truck, or other automotive vehicle). Configurations in which vehicle 10 is a robot (e.g., an autonomous robot) or other vehicle that does not carry human passengers may also be used. Vehicles such as automobiles may sometimes be described herein as an example.

Vehicle 10 may be manually driven (e.g., by a human driver), may be operated via remote control, and/or may be autonomously operated (e.g., by an autonomous driving system or other autonomous propulsion system). Using vehicle sensors such as lidar, radar, visible and/or infrared cameras (e.g., two-dimensional and/or three-dimensional cameras), proximity (distance) sensors, and/or other sensors, an autonomous driving system and/or driver-assistance system in vehicle 10 may perform automatic braking, steering, and/or other operations to help avoid pedestrians, inanimate objects, and/or other external structures on roadways.

Vehicle 10 may include a body such as vehicle body 12. Body 12 may include vehicle structures such as body panels formed from metal and/or other materials, may include doors 18, a hood, side body panels, a trunk, fenders, a chassis to which wheels are mounted, a roof, etc. Windows (sometimes referred to as glazings) such as window 14 may be coupled to body 12 and may be configured to cover openings in body 12. Windows may be formed in doors 18 and other portions of vehicle body 12 (e.g., on the sides of vehicle body 12, on the roof of vehicle 10, and/or in other portions of vehicle 10). FIG. 1 shows a window 14 formed on a front F of vehicle 10 (e.g., a front windshield). Windows (e.g., window 14), doors 18, and other portions of body 12 may separate interior region 20 of vehicle 10 from the exterior environment (e.g., exterior region 16) that is surrounding vehicle 10. Doors 18 may be opened and closed to allow people to enter and exit vehicle 10. Seats and other structures may be formed in the interior of vehicle body 12.

Motorized window positioners may be used to open and close windows 14, if desired. The windows in system 10 such as window 14 may include a front window mounted within an opening in body 12 at the front of a vehicle (e.g., a front windshield), a moon roof (sun roof) window or other window extending over some or all of the top of a vehicle, a rear window at the rear of a vehicle, and/or side windows on the sides of a vehicle. Window 14 may be flat or window 14 may have one or more curved portions. The area of each window 14 in system 10 may be at least 0.1 m², at least 0.5 m², at least 1 m², at least 5 m², at least 10 m², less than 20 m², less than 10 m², less than 5 m², or less than 1.5 m² (as examples).

Vehicle 10 may have automotive lighting such as one or more headlights (sometimes referred to as headlamps), driving lights, fog lights, daytime running lights, turn signals, brake lights, and/or other lights. In some cases, vehicle 10 may include an exterior display that is configured to display content at the exterior of the vehicle.

Vehicle 10 may have components 24. Components 24 may include propulsion and steering systems (e.g., manually adjustable driving systems and/or autonomous driving systems having wheels coupled to body 12, steering controls, one or more motors for driving the wheels, etc.), and other vehicle systems. Components 24 may include control circuitry and input-output devices. Control circuitry in components 24 may be configured to run an autonomous driving application, a navigation application (e.g., an application for displaying maps on a display), and software for controlling vehicle climate control devices, lighting, media playback, window movement, door operations, sensor operations, and/or other vehicle operations. For example, the control system may form part of an autonomous driving system that drives vehicle 10 on roadways autonomously using data such as sensor data. The control circuitry may include processing circuitry and storage and may be configured to perform operations in vehicle 10 using hardware (e.g., dedicated hardware or circuitry), firmware and/or software. Software code for performing operations in vehicle 10 and other data is stored on non-transitory computer readable storage media (e.g., tangible computer readable storage media) in the control circuitry. The software code may sometimes be referred to as software, data, program instructions, computer instructions, instructions, or code. The non-transitory computer readable storage media may include non-volatile memory such as non-volatile random-access memory, one or more hard drives (e.g., magnetic drives or solid-state drives), one or more removable flash drives or other removable media, or other storage. Software stored on the non-transitory computer readable storage media may be executed on the processing circuitry of components 24. The processing circuitry may include application-specific integrated circuits with processing circuitry, one or more microprocessors, a central processing unit (CPU) or other processing circuitry.

The input-output devices of components 24 may include displays, light-emitting diodes and other light-emitting devices, haptic devices, speakers, and/or other devices for providing output. Output devices in components 24 may, for example, be used to provide vehicle occupants and others with haptic output, audio output, visual output (e.g., displayed content, light, etc.), and/or other desired output. The input-output devices of components 24 may also include input devices such as buttons, sensors, and other devices for gathering user input, for gathering environmental measurements, for gathering information on vehicle operations, and/or for gathering other information. The sensors in components 24 may include ambient light sensors, touch sensors, force sensors, proximity sensors, optical sensors such as cameras operating at visible, infrared, and/or ultraviolet wavelengths (e.g., fisheye cameras, two-dimensional cameras, three-dimensional cameras, and/or other cameras), capacitive sensors, resistive sensors, ultrasonic sensors (e.g., ultrasonic distance sensors), microphones, radio-frequency sensors such as radar sensors, lidar (light detection and ranging) sensors, door open/close sensors, seat pressure sensors and other vehicle occupant sensors, window sensors, position sensors for monitoring location, orientation, and movement, speedometers, satellite positioning system sensors, and/or other sensors.

During operation, the control circuitry of components 24 may gather information from sensors and/or other input-output devices such as lidar data, camera data (e.g., two-dimensional images), radar data, and/or other sensor data. This information may be used by an autonomous driving system and/or driver's assistance system in vehicle 10.

Figure 2:
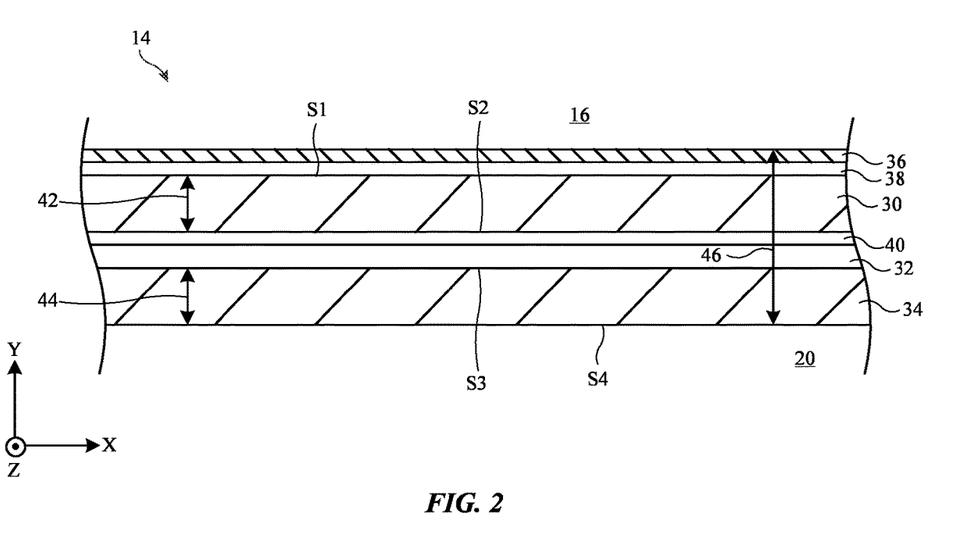
FIG. 2 is a cross-sectional side view of an illustrative laminated polymer window in accordance with an embodiment.

Window 14 may be formed from one or more layers of transparent glass. However, it may be difficult to manufacture glass windows having desired curvature. Windows 14 may therefore instead be manufactured using one or more layers of clear polymer (e.g., polycarbonate, polymethyl methacrylate, etc.). FIG. 2 is a cross-sectional side view of an illustrative window 14 formed from two polymer layers that are laminated together with adhesive.

As shown in FIG. 2, window 14 includes clear polymer layers 30 and 34 (sometimes referred to as outer layer 30 and inner layer 34 or outer polymer layer 30 and inner polymer layer 34). Clear polymer layers 30 and 34 may be formed from polycarbonate (PC), as one example. Outer layer 30 and inner layer 34 may be laminated together using a polymer layer such as interposed adhesive layer 32 (e.g., an adhesive layer with one surface bonded to the inwardly facing surface of outer window layer 30 and an opposing surface bonded to the outwardly facing surface of inner window layer 34). Adhesive layer 32 (sometimes referred to as polymer layer 32, polymer interlayer 32, adhesive polymer interlayer 32, etc.) may be formed from polyvinyl butyral (PVB), ethylene-vinyl acetate (EVA), thermoplastic polyurethane (TPU), or any other desired material. Adhesive layer 32 may be an elastic adhesive layer with a Young's modulus that is lower than the Young's modulus of layers 30 and 34. Adhesive layer 32 serves to keep polymer layers 30 and 34 together even in the event polymer layers 30 and 34 break. This enhances the safety of window 14 by mitigating the possibility of pieces of polymer layers 30 and 34 falling or otherwise becoming safety hazards (even during break events). Adhesive layer 32 may also prevent polymer layers 30 and/or 34 from breaking into large, sharp pieces during a break event.

Polymer layer 30 has a thickness 42 and polymer layer 34 has a thickness 44. The window may have a total thickness 46. Thicknesses 42 and 44 may be the same or may be different. Each one of thicknesses 42 and 44 may be greater than 1 millimeter, greater than 2 millimeters, greater than 3 millimeters, greater than 4 millimeters, greater than 5 millimeters, greater than 10 millimeters, less than 3 millimeters, less than 4 millimeters, less than 5 millimeters, less than 10 millimeters, between 1.5 millimeters and 6 millimeters, between 2 millimeters and 3 millimeters, etc. Total thickness 44 may be greater than 3 millimeters, greater than 4 millimeters, greater than 5 millimeters, greater than 6 millimeters, greater than 10 millimeters, greater than 20 millimeters, less than 6 millimeters, less than 10 millimeters, less than 20 millimeters, between 4 and 10 millimeters, etc.

In the example of FIG. 2, polymer layer 30 is an outer polymer layer with an outer surface S1 and inner surface S2. Polymer layer 34 is an inner polymer layer with an outer surface S3 and inner surface S4. In other words, polymer layer 30 is interposed between exterior 16 and polymer layer 34. Polymer layer 34 is interposed between interior 20 and polymer layer 30. Surface S1 is interposed between exterior 16 and surface S2. Surface S4 is interposed between interior 20 and surface S3.

The mechanical strength of window 14 may be provided primarily by polymer layers 30 and 34 as well as adhesive layer 32. However, one or more additional functional layers may be included in window 14 if desired. The additional functional layers may be incorporated on one or more of surfaces S1, S2, S3, and S4. In FIG. 2, a hard coat 36 and ultraviolet light blocking coating 38 are formed on outer surface S1 of polymer layer 30. Hard coat 36 may be a thermally cured coating that provides scratch resistance for window 14, as one example. Ultraviolet light blocking coating 38 may block ultraviolet light (e.g., more than 80%, more than 90%, more than 95%, more than 99%, etc.) from reaching interior 20. In FIG. 2, a thermal coating 40 (e.g., a silver-based coating) is included on inner surface S2 of outer polymer layer 30. Thermal coating 40 (sometimes referred to as a thermally reflective coating) may block infrared light (e.g., more than 50%, more than 80%, more than 90%, more than 95%, more than 99%, etc.) to maintain thermal comfort in interior 20 of vehicle 10.

The examples of functional layers shown in FIG. 2 are merely illustrative. If desired, one or more of layers 36, 38, and 40 may optionally be omitted from window 14. Additionally, one or more additional functional layers may optionally be included in window 14. For example, a masking layer such as a black masking layer may be included in window 14 (e.g., on surface S2, on surface S3, etc.) to hide attachment features, for cosmetic reasons, etc. Optional fixed and/or adjustable optical components may also be incorporated into window 14. Each optical layer may be a fixed and/or adjustable optical layer providing fixed and/or adjustable amounts of opacity, polarization, reflection, color cast, haze, and/or other optical properties. In one illustrative configuration, an optical layer may be included between polymer layers 30 and 34 (e.g., instead of or in addition to functional layer 40 in FIG. 2). The optical layer may be a light guide that receives light from a light source at the edge of the window. The light source 26 may, as an example, provide visible light that is guided across window 14 within the light guide by total internal reflection. Light-scattering structures may be provided in window 14 to extract some of the guided light from the light guide (e.g., inwardly to produce illumination for interior region 20 and/or outwardly).

Using polymer layers for the laminated window may allow for additional functional layers (such as those discussed above) to be integrated more easily (e.g., using overmolding). Mechanical alignment fixtures, seals, lighting components (for interior and/or exterior lighting), and/or display screens may all be more easily integrated into window 14 when the window is formed from polymer layers.

Adhesive layer 32 may have a refractive index that is matched (e.g., within 0.1, within 0.07, within 0.05, or within 0.03) to that of layers 30 and 34. Layer 32 may, if desired, include polymer configured to provide sound dampening (e.g., a soft polyvinyl butyral sublayer or other acoustic film embedded within layer 32).

Each layer in window 14 (e.g., layers 36, 38, 30, 40, 32, and 34) may be substantially transparent to visible light (e.g., having a transparency to visible light that is greater than 80%, greater than 90%, greater than 95%, greater than 99%, greater than 99.9%, etc.). Alternatively, in some arrangements one or more of the layers in window 14 may be made darker to improve the cosmetics of the window (e.g., reflections) and/or provide privacy to the occupant.

Window 14 in system 10 may be completely planar (e.g., the inner and outer surfaces of window 14 may be flat) and/or some or all of the windows in system 10 may have surface curvature. The inner and outer surfaces of each window may as an example, have compound curvature (e.g., non-developable surfaces characterized by curved cross-sectional profiles taken along the X and Z directions of FIG. 2) and/or may have developable surfaces (surfaces with zero Gaussian curvature that can be flattened without distortion).

Curvature in window 14 may be characterized by surface strain (the percentage of stretch/compression in a local area to form a shape from flat) and/or radius of curvature (the radius of a circular arc that best approximates the curve at a given point). Window 14 (e.g., polymer layers 30 and/or 34) may have a maximum surface strain of greater than 3%, greater than 4%, greater than 5%, greater than 6%, greater than 8%, less than 10%, less than 8%, less than 7%, between 5% and 7%, between 2% and 8%, etc.). Window 14 (e.g., polymer layers 30 and/or 34) may have a minimum radius of curvature of less than 5 meters, less than 2 meters, less than 1 meter, less than 0.5 meters, less than 0.1 meters, less than 0.05 meters, greater than 0.05 meters, between 0.1 meters and 2 meters, etc.

Forming outer layer 30 and inner layer 34 of window 14 from polymer (as opposed to glass) may allow for window 14 to have greater curvature (e.g., a maximum surface strain of greater than 5%, as one example). However, care must be taken for window 14 to also meet safety requirements as well as acoustic targets.

Care may be taken to ensure that window 14 meets all applicable safety requirements and regulations. One safety criterion applicable to windows in an automobile is the head injury criterion (HIC). HIC is a measure of the likelihood of head injury arising from an impact. HIC is derived from measurements of one or more accelerometers mounted in a crash test dummy's head during testing. HIC may be calculated using the formula: $[1/t_2-t_1 \int_{t_1}^{t_2} adt]^{2.5} (t_2-t_1)$, where a is head acceleration and $t_2-t_1$ is selected so as to maximize HIC. A higher HIC correlates to a higher probability of head injury. It is therefore desirable to reduce the HIC value for a window.

Various safety institutes may have differing requirements for HIC. However, it is generally desirable for the HIC of window 14 to be low. Depending upon the specific design, window 14 may have an HIC of less than 1700, less than 1000, less than 700, less than 650, less than 500, less than 400, less than 300, etc.

Figure 3:
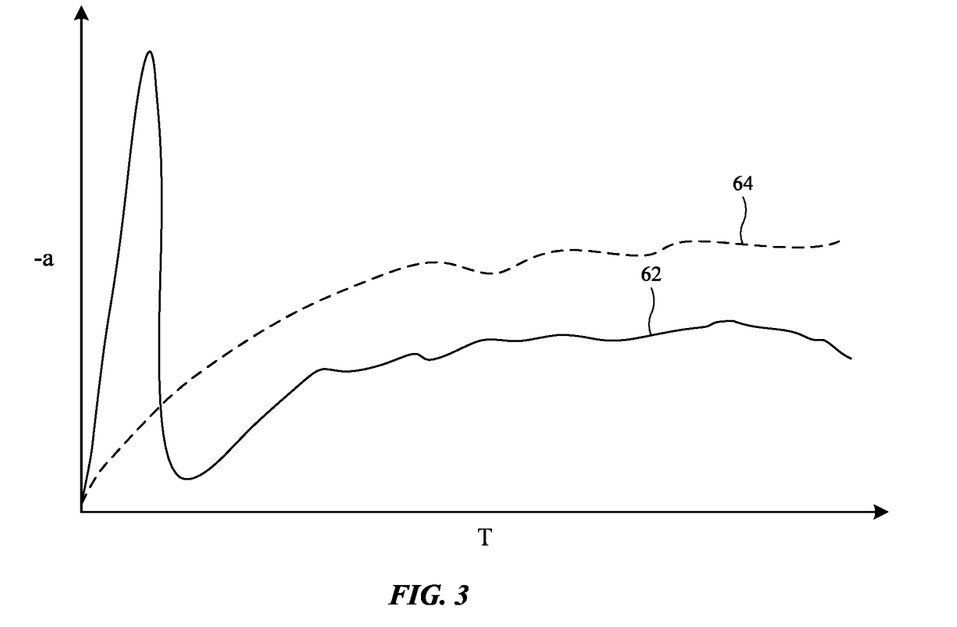
FIG. 3 is a graph showing deceleration over time for different window types in accordance with an embodiment.

As previously mentioned, layers 30 and 34 of laminated window 14 may be formed from polymer such as polycarbonate instead of glass to allow window 14 to have desired curvature. However, using polycarbonate layers 30 and 34 may result in window 14 having an HIC that is higher than if a laminated glass window is used. FIG. 3 is a graph of deceleration (-a) as a function of time (T) caused by different windows during a crash test. Profile 62 shows the deceleration when a glass laminated window is used (e.g., window 14 in FIG. 2 when layers 30/34 are glass layers of a given thickness). Profile 64 shows the deceleration when a polycarbonate laminated window is used (e.g., window 14 in FIG. 2 when layers 30/34 are polycarbonate layers of the same given thickness).

Glass layers may be more brittle than polycarbonate layers of the same thickness. During an impact event, the brittle glass layers may initially cause a spike in deceleration (as shown by profile 62) but then quickly break, which mitigates the applied deceleration for the remainder of the test. As shown by profile 64, polycarbonate layers may be less brittle than glass and therefore may not break upon impact, resulting in a higher deceleration than glass after the initial spike of profile 62.

To achieve target safety requirements (e.g., a target HIC) while maintaining the curved shapes enabled by the polycarbonate, thin layers of polycarbonate may be used. As an example, polycarbonate layers 30 and 34 in FIG. 2 may each have a thickness (e.g., a uniform, central, and/or maximum thickness) that is less than 2.5 millimeters, less than 2.1 millimeters, less than 2.0 millimeters, less than 1.8 millimeters, less than 1.5 millimeters, etc. As another example, one or more fuse structures (e.g., a low thickness area that will preferentially break) may be integrated into the glazing to achieve target safety requirements. However, reducing the thickness of layers 30 and 34 in window 14 may reduce the acoustic performance of the window. In general, using thicker layers for layers 30 and 34 improves the noise-dampening properties of the window during operation of the vehicle.

Figure 4:
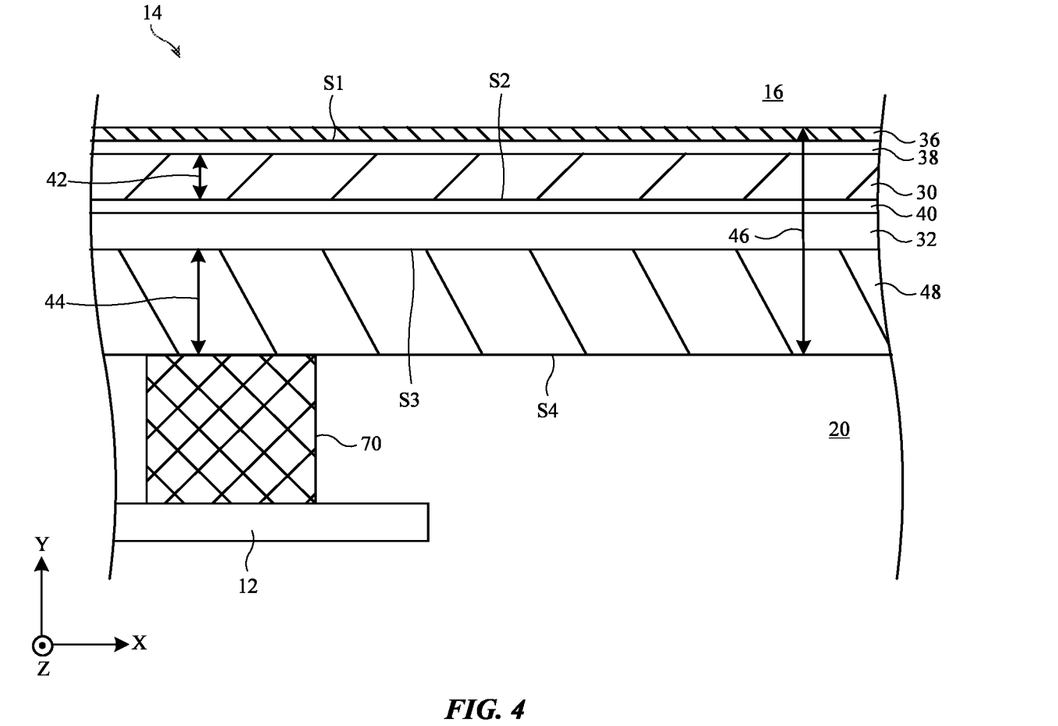
FIG. 4 is a cross-sectional side view of an illustrative laminated polymer window with inner and outer layers formed from different materials in accordance with an embodiment.

To optimize safety performance and acoustic performance in window 14, the inner layer of window 14 may be formed from a different material than the outer layer of window 14. FIG. 4 is a cross-sectional side view of a window of this type. Window 14 in FIG. 4 is similar to the window in FIG. 2 and common components will not be described again in connection with FIG. 4.

In FIG. 4, window 14 includes an inner layer 48 that is formed from a different material than outer layer 30. In one example, inner layer 48 is formed from polymethyl methacrylate (PMMA) whereas outer layer 30 is formed from polycarbonate (PC). Inner layer 48 may be formed from other polymer materials if desired (e.g., polystyrene, polyvinyl chloride, polyoxymethylene, etc.).

In FIG. 4, polymer layer 30 has a thickness 42 and polymer layer 34 has a thickness 44. Thickness 44 may be greater than thickness 42. The window may have a total thickness 46. Each one of thicknesses 42 and 44 may be greater than 1 millimeter, greater than 2 millimeters, greater than 3 millimeters, greater than 4 millimeters, greater than 5 millimeters, greater than 10 millimeters, less than 3 millimeters, less than 4 millimeters, less than 5 millimeters, less than 10 millimeters, between 1.5 millimeters and 6 millimeters, between 2 millimeters and 3 millimeters, etc. Total thickness 44 may be greater than 3 millimeters, greater than 4 millimeters, greater than 5 millimeters, greater than 6 millimeters, greater than 10 millimeters, greater than 20 millimeters, less than 6 millimeters, less than 10 millimeters, less than 20 millimeters, between 4 and 10 millimeters, etc. Thickness 44 may be greater than thickness 42 by at least 0.1 millimeter, by at least 0.3 millimeters, by at least 0.5 millimeters, by at least 1 millimeter, by at least 2 millimeters, by at least 3 millimeters, by at least 5 millimeters, by between 0.1 and 5 millimeters, by between 0.5 and 2 millimeters, etc. Thickness 44 may be greater than thickness 42 by at least 5%, by at least 10%, by at least 20%, by at least 50%, by at least 100%, etc. Using a thicker inner layer 48 as in FIG. 4 may improve the acoustic performance of window 14.

As previously discussed in connection with FIG. 3, the brittleness of glass may improve the safety performance of window 14. One way to characterize the brittleness of a material is through Young's modulus (a ratio of tensile stress to tensile strain). Young's modulus may also sometimes be referred to as tensile modulus. In general, materials with a higher Young's modulus tend to be more brittle and materials with lower Young's modulus tend to be less brittle. It should be understood that the magnitudes for Young's modulus of materials provided herein may be obtained using the same testing conditions (e.g., 1 millimeter/minute). Glass may have a Young's modulus between 50 GPa and 90 GPa. In contrast, polycarbonate may have a lower Young's modulus than glass (e.g., between 2 GPa and 3 GPa).

For comparison, adhesive layer 32 may be formed from a low-modulus material having a Young's modulus that is less than 5 GPa, less than 2 GPa, less than 1 GPa, less than 0.5 GPa, less than 0.3 GPa, greater than 0.1 GPa, between 0.1 GPa and 1 GPa, etc. The Young's modulus for adhesive layer 32 may be lower than that of layers 30 and 48.

To make layer 48 more brittle and improve the safety performance of window 14, layer 48 may be formed from a material with a higher Young's modulus than layer 30. Layer 48 may be formed from PMMA with a Young's modulus of 5 GPa, as one example.

Layer 48 may have a greater Young's modulus than layer 30 by at least 0.1 GPa, at least 0.3 GPa, at least 0.5 GPa, at least 1 GPa, at least 2 GPa, at least 5 GPa, at least 20 GPa, between 0.3 GPa and 5 GPa, less than 20 GPa, etc. Layer 48 may have a greater Young's modulus than layer 30 by at least 5%, by at least 10%, by at least 20%, by at least 50%, by at least 100%, etc.

The example in FIG. 4 of outer layer 30 being formed from polycarbonate and inner layer 48 being formed from PMMA is merely illustrative. This arrangement may sometimes be desirable to provide a durable outer layer. If desired, this arrangement may be switched (with a PMMA outer layer and a polycarbonate inner layer). In general, window 14 may be formed from two polymer layers. One of the polymer layers may have a first thickness and a first Young's modulus. The other polymer layer may have a second thickness that is greater than the first thickness (e.g., by at least 5%, by at least 10%, by at least 20%, by at least 50%, by at least 100%, etc.) and a second Young's modulus that is greater than the first Young's modulus (e.g., by at least 5%, by at least 10%, by at least 20%, by at least 50%, by at least 100%, etc.). The window may have a satisfactory HIC (e.g., lower than 1000, lower than 650, etc.), may have curvature (e.g., a maximum surface strain greater than 5%), and may have satisfactory acoustic performance (e.g., may have a total thickness that is greater than 5 millimeters, greater than 6 millimeters, etc.).

In the example of FIG. 4, window 14 is attached to body 12 of vehicle 10 by adhesive 70. Adhesive 70 may be formed from urethane or any other desired material. In FIG. 4, adhesive 70 attaches inner layer 48 of window 14 directly to body 12. In other words, inner surface S4 of inner layer 48 is in direct contact with adhesive 70. Adhesive 70 is in direct contact with inner layer 48 and body 12. This example is merely illustrative.

Inner layer 48 may be more brittle than layer 30 (as previously discussed). In some cases, it may be undesirable to attach adhesive 70 directly to the more brittle inner layer 48. In these cases, window 14 may optionally have an arrangement of the type shown in FIG. 5. Window 14 in FIG. 5 is similar to the window in FIG. 4 and common components will not be described again in connection with FIG. 5.

Figure 5:
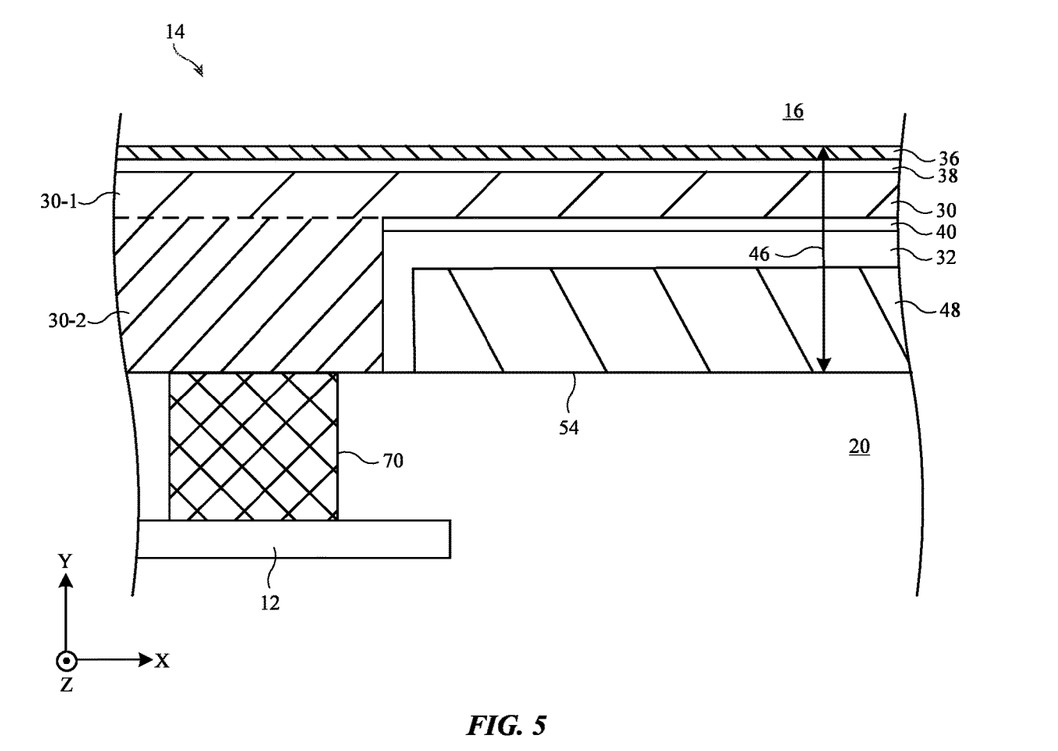
FIG. 5 is a cross-sectional side view of an illustrative laminated polymer window with an outer layer that has a ring-shaped opaque portion in accordance with an embodiment.

As shown in FIG. 5, outer layer 30 may be formed with a first portion 30-1 and an integral second portion 30-2. First portion 30-1 may be formed from transparent polycarbonate and extends across the entire face of the window. The integral second portion 30-2 may be provided so that adhesive 70 may be attached to the less brittle polycarbonate layer 30 as opposed to the more brittle PMMA (or other polymer) inner layer 48. Second portion 30-2 may include polycarbonate (or the same base material as portion 30-1).

Second portion 30-2 may also include one or more additional materials such as acrylonitrile butadiene styrene (ABS). The additional material may optionally be used to provide a non-transparent color to portion 30-2. Portion 30-2 may be, for example, a black (opaque) portion with a transparency of less than 50%, less than 30%, less than 10%, less than 5%, less than 1%, less than 0.1%, etc. Portion 30-2 therefore hides adhesive layer 70 from being visible through window 14 from exterior region 16.

Figure 6:
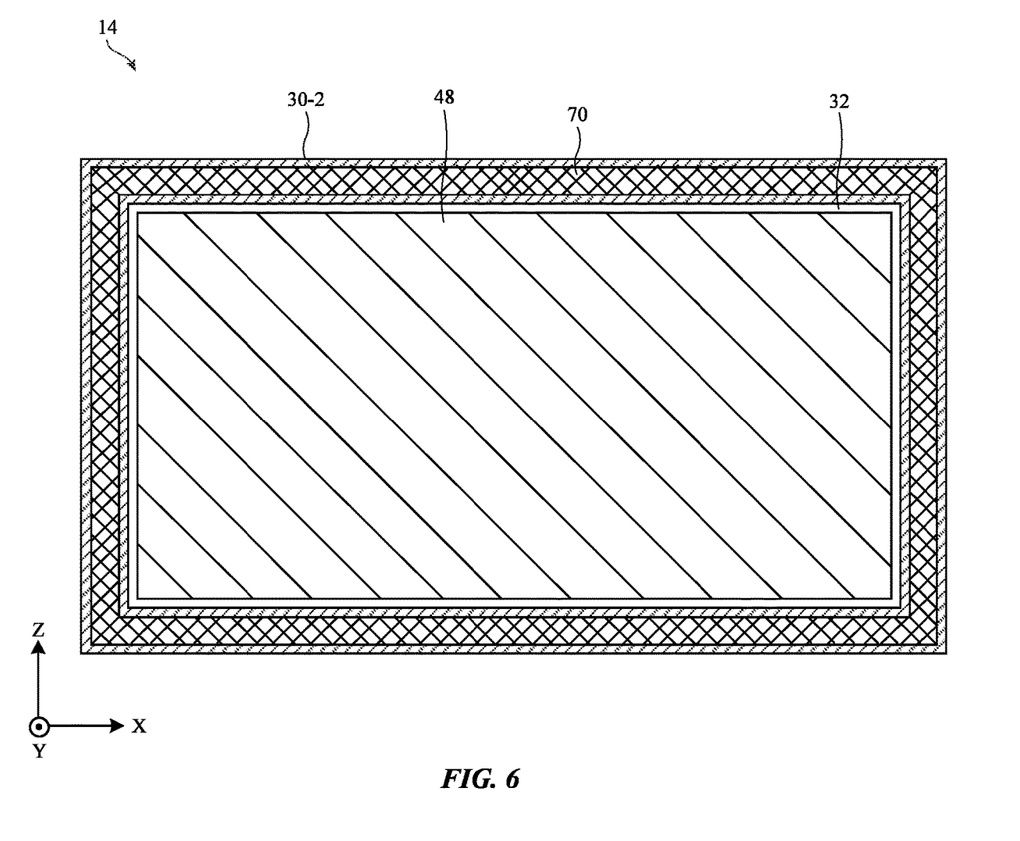
FIG. 6 is a top view of an illustrative laminated polymer window with an outer layer that has a ring-shaped opaque portion such as the window of FIG. 5 in accordance with an embodiment.

FIG. 6 is a top view of window 14 from FIG. 5 in the Y-direction from the interior side of window 14. As shown in FIG. 6, portion 30-2 of layer 30 may be formed in a ring that defines a central opening. Inner layer 48 is formed in (overlaps in the Y-direction) the central opening. A portion of adhesive layer 32 may be interposed between portion 30-2 and layer 48 (as shown in FIGS. 5 and 6). Adhesive 70 may also be formed in a ring (e.g., with a similar footprint to portion 30-2). Adhesive 70 also defines a central opening, with inner layer 48 being formed in (overlapping) the central opening.

The example in FIG. 6 of portion 30-2 and adhesive 70 being formed in a continuous ring that completely surrounds the periphery of window 14 is merely illustrative. If desired, portion 30-2 and/or adhesive 70 may have footprints of other shapes (e.g., with discrete sections that approximate a ring around the periphery without completely surrounding the periphery). Portion 30-2 and adhesive 70 may have approximately the same footprint (as shown in FIG. 6) or may have different footprints (e.g., portion 30-2 may form a continuous ring whereas adhesive 70 has non-continuous, discrete sections that approximate a ring). In FIG. 6, the periphery of window 14 (and therefore portion 30-2 and adhesive 70) has a non-square rectangular shape. This example is merely illustrative. In general, window 14 may have any desired shape.

Figure 7:
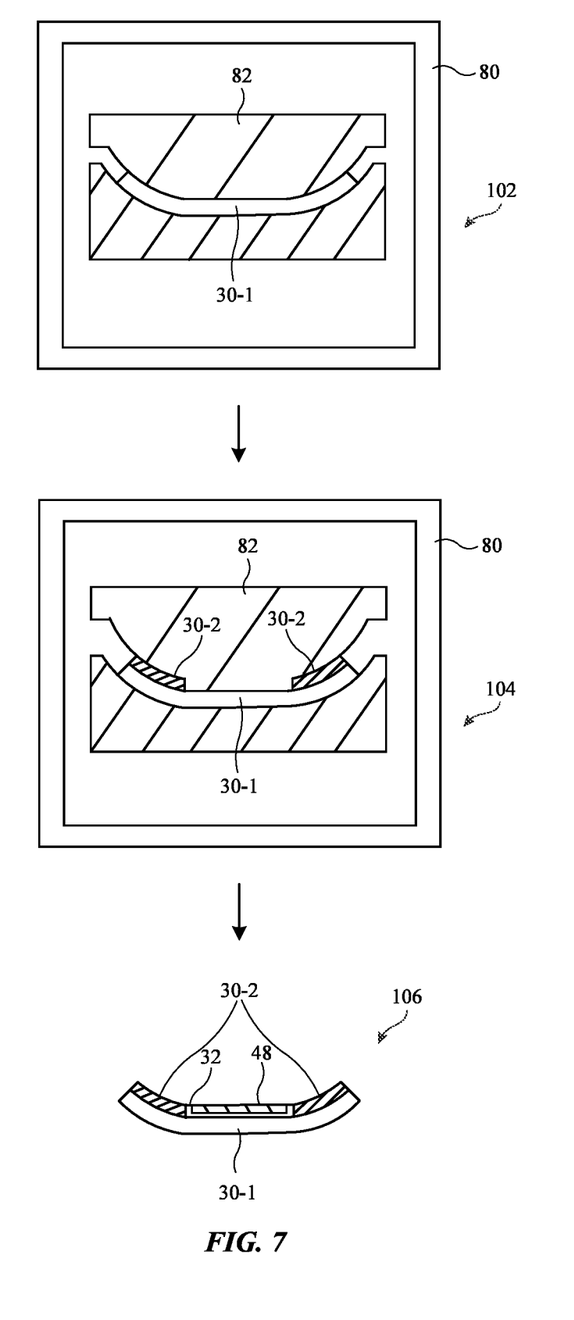
FIG. 7 is a diagram of illustrative method steps for forming a polymer layer that has a ring-shaped opaque portion such as the outer layer in FIG. 5 in accordance with an embodiment.

FIG. 7 is a diagram showing illustrative method steps that may be used to form a window of the type shown in FIG. 5 (where the outer polymer layer has an integral additional portion that is attached directly to adhesive). During polymer molding operations, molding equipment may be used to form sheets of polymer with curved cross-sectional profiles. These molded window layers may be characterized by curved cross-sectional profiles and may have surfaces that are free of compound curvature (e.g., the window layers may have only developable surfaces), may have surfaces that are free of developable surface areas (e.g., the window layers may have surfaces with only compound curvature), and/or may have both one or more areas characterized by developable surfaces and one or more areas characterized by compound curvature.

As shown in FIG. 7, portion 30-1 of inner polymer layer 30 may be formed using heated furnace 80 and mold 82. Mold 82 may be formed with a desired curved shape (that is imparted onto inner polymer layer 30). Mold 82 may be formed from a material such as graphite that can withstand high temperatures. During step 102, injection compression molding (sometimes referred to as coining) may be used to form portion 30-1 of inner polymer layer 30.

During injection molding, material is injected into a cavity formed by the mold. The cavity is completely filled during injection molding. During injection compression molding (as in step 102 of FIG. 7), a cavity for portion 30-1 may be mostly but not entirely filled while at a lower pressure than during injection molding (e.g., while the mold is not entirely closed). Subsequently, the mold is clamped (closed) to form the final shape of the material. Injection compression molding has a much lower fill pressure than injection molding. This lower pressure may improve the optical properties of portion 30-1 at step 102 relative to if injection molding was used.

At step 104, injection molding may be used to form portion 30-2 of layer 30. Portion 30-2 may be opaque and therefore the optical properties of portion 30-2 may be less impactful than the optical properties of portion 30-1. Accordingly, injection molding is used at step 104 instead of injection compression molding. As shown in FIG. 7, at step 104 portion 30-2 may be formed directly on portion 30-1 using mold 82. Portion 30-2 may be formed in a ring around the periphery of portion 30-1 (as shown in the top view of FIG. 6, for example).

Portion 30-1 in FIG. 7 is formed with a curved cross-sectional profile. Portion 30-2 in FIG. 7 is also formed with a curved cross-sectional profile.

Finally, at step 106, inner polymer layer 48 may be laminated to outer layer 30 using adhesive layer 32. Inner polymer layer 48 is formed in a central opening defined by the ring shape of portion 30-2. Inner polymer layer 48 may be planar (flat) as shown in the example of FIG. 7. Alternatively, inner polymer layer 48 may be formed (e.g., using an injection compression molding process similar to as shown in step 102) with desired curvature. The curved inner polymer layer 48 is then laminated to curved outer polymer layer 30 at step 106.

The method for forming a laminated polymer window shown in FIG. 7 is merely illustrative. In general, any desired method steps (e.g., injection molding, injection compression molding, lamination, compression molding, etc.) may be used to form laminated windows of the type shown in FIGS. 2, 4, and 5.

To summarize, a system such as a vehicle (automobile) may include a laminated polymer window with an outer polymer layer and an inner polymer layer. In one possible arrangement, the outer polymer layer and the inner polymer layer may be formed from polycarbonate. In another possible arrangement, one of the polymer layers (e.g., the outer polymer layer) may be formed from polycarbonate whereas the other polymer layer (e.g., the inner polymer layer) may be formed from a different, more brittle material such as PMMA. The more brittle layer (e.g., the inner layer) may be thicker than the other polymer layer. The outer polymer layer may have an integrally formed portion that forms a ring around the inner polymer layer and that is in direct contact with adhesive.

It should further be noted that the inner polymer layer may be omitted from window 14 if desired. In this type of arrangement, a single polymer layer may form window 14. The single polymer layer may be formed from polycarbonate, PMMA, or another desired material that provides desired safety performance, acoustic performance, and curvature.

The foregoing is merely illustrative and various modifications can be made to the described embodiments. The foregoing embodiments may be implemented individually or in any combination.

What is claimed is:

1. A window, comprising:
    an inner polymer layer having a first Young's modulus;
    an outer polymer layer having a second Young's modulus that is less than the first Young's modulus;
    an adhesive layer that attaches the inner polymer layer and the outer polymer layer together, wherein the adhesive layer has a third Young's modulus that is less than the first Young's modulus and the second Young's modulus;

a hard coating, wherein the outer polymer layer is interposed between the hard coating and the inner polymer layer; and a thermal coating, wherein the adhesive layer is interposed between the thermal coating and the inner polymer layer.

2. The window in claim 1, wherein the inner polymer layer has a greater thickness than the outer polymer layer.

3. The window in claim 1, wherein the inner polymer layer is formed from polymethyl methacrylate (PMMA) and wherein the outer polymer layer is formed from polycarbonate.

4. The window in claim 1, wherein the outer polymer layer has a transparent portion and an integral opaque portion that forms a ring around the inner polymer layer.

5. The window defined in claim 1, wherein the outer polymer layer is formed from polycarbonate.

6. The window defined in claim 5, wherein the inner polymer layer is formed from polycarbonate.

7. The window defined in claim 5, wherein the inner polymer layer is formed from a different material than the outer polymer layer.

8. The window defined in claim 1, wherein the inner polymer layer has a first thickness and wherein the outer polymer layer has a second thickness that is different than the first thickness.

9. The window defined in claim 8, wherein the first thickness is greater than the second thickness.

10. The window defined in claim 1, further comprising: an optical layer that is interposed between the inner polymer layer and the outer polymer layer.

11. The window defined in claim 1, wherein the outer polymer layer has a transparent portion and an opaque portion, wherein the opaque portion is formed in a ring around a periphery of the outer polymer layer and defines a central opening, and wherein the inner polymer layer is formed in the central opening.

12. The window defined in claim 11, further comprising: adhesive that attaches the opaque portion of the outer polymer layer to a system body, wherein the opaque portion of the outer polymer layer is interposed between the adhesive and the transparent portion of the outer polymer layer.

13. A window, comprising:
an inner polymer layer having a first Young's modulus;
an outer polymer layer having a second Young's modulus that is less than the first Young's modulus; and
an adhesive layer that attaches the inner polymer layer and the outer polymer layer together, wherein the adhesive layer has a third Young's modulus that is less than the first Young's modulus and the second Young's modulus and wherein the outer polymer layer has a curved cross-sectional profile and a maximum surface strain that is greater than 4%.

14. The window defined in claim 13, wherein the outer polymer layer has compound curvature.

15. A window comprising:
an inner polymer layer;
an outer polymer layer, wherein the outer polymer layer has a transparent portion and an opaque portion, the opaque portion is formed in a ring around a periphery of the outer polymer layer and defines a central opening, and the inner polymer layer is formed in the central opening;
an adhesive layer that is interposed between the inner polymer layer and the outer polymer layer; and
additional adhesive attached to the outer polymer layer, wherein the opaque portion of the outer polymer layer is interposed between the additional adhesive and the transparent portion of the outer polymer layer.

16. The window defined in claim 15, wherein the outer polymer layer has compound curvature.

17. The window defined in claim 15, wherein the outer polymer layer has a curved cross-sectional profile and a maximum surface strain that is greater than 4%.

\* \* \* \* \*